US008769685B1

(12) United States Patent
Conrad et al.

(10) Patent No.: US 8,769,685 B1
(45) Date of Patent: Jul. 1, 2014

(54) SYSTEMS AND METHODS FOR USING FILE PATHS TO IDENTIFY POTENTIALLY MALICIOUS COMPUTER FILES (75) Inventors: Robert Conrad, Culver City, CA (US); David Kane, Los Angeles, CA (US)

(73) Assignee: Symantec Corporation, Mountain View, CA (US)

( * ) Notice: Subject to any disclaimer, the term of this patent is extended or adjusted under 35 U.S.C. 154(b) by 356 days.

(21) Appl. No.: 12/699,183

(22) Filed: Feb. 3, 2010

(51) Int. Cl.
*G06F 21/00* (2013.01)
(52) U.S. Cl.
USPC .................................. 726/23; 726/24; 726/25
(58) Field of Classification Search
USPC ...................................................... 726/23, 24
See application file for complete search history.

(56) References Cited

U.S. PATENT DOCUMENTS

2007/0192863 A1* 8/2007 Kapoor et al. ................. 726/23
2008/0092242 A1* 4/2008 Rowley ........................... 726/27
2010/0186088 A1* 7/2010 Banerjee et al. ................ 726/23
2011/0083180 A1* 4/2011 Mashevsky et al. ........... 726/23

OTHER PUBLICATIONS

Neil C. Rowe Publication May 2005—Automatic Detection of Fake File Systems.*

* cited by examiner

*Primary Examiner* — Jung Kim
*Assistant Examiner* — Tri Tran
(74) *Attorney, Agent, or Firm* — ALG Intellectual Property, LLC (57) ABSTRACT

A computer-implemented method for using file paths to identify potentially malicious computer files may include: 1) identifying a file, 2) identifying a file path associated with the file, 3) determining, by applying a heuristic to the file, that at least a portion of the file path is likely to have been randomly generated, 4) determining, based at least in part on the determination that at least portion of the file path has likely been randomly generated, that the file is potentially malicious, and 5) performing a security operation on the file. Corresponding systems and computer-readable instructions embodied on computer-readable media are also disclosed.

18 Claims, 6 Drawing Sheets

SYSTEMS AND METHODS FOR USING FILE PATHS TO IDENTIFY POTENTIALLY MALICIOUS COMPUTER FILES

BACKGROUND

Consumers and businesses face a growing tide of malicious software that threatens the stability and performance of their computers and the security of their data. Computer programmers with malicious motivations have created and continue to create viruses, Trojan horses, worms, and other programs (collectively known as "malware") in an attempt to compromise computer systems. In an attempt to evade detection, malicious programmers may inject malware into or among legitimate programs.

Many security software companies attempt to combat malware by creating and deploying malware signatures (e.g., hash functions that uniquely identify malware) to their customers on a regular basis. However, a significant amount of malware has not yet been identified and therefore cannot be detected using traditional signature-based malware-detection mechanisms, particularly since malware authors may regularly modify their malware in an attempt to circumvent commonly employed signature-based malware-detection mechanisms. For example, malware authors may use randomly generated file install locations and file names to avoid conventional malware-detection mechanisms, such as simple file path pattern detection algorithms. As such, the instant disclosure identifies a need for improved malware-detection mechanisms and techniques.

SUMMARY

As will be described in greater detail below, the instant disclosure generally relates to systems and methods for using file paths to identify potentially malicious computer files. In one example, one or more of the various systems described herein may accomplish this task by: 1) identifying a file, 2) identifying a file path that is associated with the file (e.g., the file directory and/or file name associated with the file), 3) determining, by applying a heuristic (such as a decision tree) to the file, that at least a portion of the file path is likely to have been randomly generated, 4) determining, based at least in part on the determination that at least portion of the file path has likely been randomly generated, that the file is potentially malicious (e.g., by determining a probability, represented as a confidence score, that the file is potentially malicious), and then 5) performing a security operation on the file (such as deleting the file from a computing device, preventing the computing device from downloading the file, preventing a computing device from communicating with a server or computing device that distributed the file, and/or identifying the file in a blacklist database and/or a reputation database).

In some examples, the systems described herein may determine that at least a portion of the file path is likely to have been randomly generated by determining, by applying the heuristic to the file, that the distribution of characters within at least a portion of the file path is likely random. In these examples, the systems described herein may determine that the distribution of characters within at least a portion of the file path is likely random by: 1) determining that the frequency of occurrence of common digraphs, trigraphs, and/or series of characters within at least a portion of the file path fails to meet a predetermined threshold, 2) determining that at least a portion of the file path contains at least one rare digraph, trigraph, and/or series of characters, and/or 3) determining the frequency and/or location of each character within the file path.

In various examples, the systems described herein may determine that a file is potentially malicious by: 1) determining whether at least a portion of the file path is located within a file-path database (such as an Internet search engine database and/or reputation database), 2) determining whether the file is identified within a blacklist database and/or whitelist database, and/or 3) determining that at least one additional malware-detection heuristic (such as a signature-based heuristic) identifies the file as potentially malicious.

In at least one example, the systems described herein may, prior to applying the heuristic to the file, train the heuristic using a corpus or set of training data (containing, for example, file paths associated with files that are known to be malicious and/or legitimate). For example, the systems described herein may train the heuristic by: 1) determining an aggregate distribution of characters within the file paths for files that are known to be malicious and/or files that are known to be legitimate and then 2) weighting each of the characters based on the aggregate distribution of the characters.

As will be explained in detail below, by training and using a heuristic to determine whether a file is potentially malicious based at least in part on whether at least a portion of a file path or file name associated with the file has likely been randomly generated, the systems and methods described herein may effectively identify malicious files, even if these malicious files are not specifically identified in a malware database, such as a blacklist. Accordingly, the systems and methods described herein may provide a greater degree of protection against constantly evolving malware threats.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for using file paths to identify potentially malicious computer files. Embodiments of the instant disclosure may enable one or more modules on a computing device to identify files that are potentially malicious by determining that at least a portion of the file paths and/or file names associated with the files contain a character distribution that is likely randomized. For example, and as will be explained in greater detail below, one or more modules on the computing device may use a heuristic to determine that the distribution of characters in a file name or file path associated with a particular file is characteristic of a randomly generated file name or file path, as opposed to a file name or file path that has been legitimately generated. According to some embodiments, one or more modules may, prior to deploying the heuristic, train the heuristic using a corpus of training data that includes a plurality of file names and/or file paths associated with files that are known to be legitimate and/or files that are known to be malicious.

Figure 1:
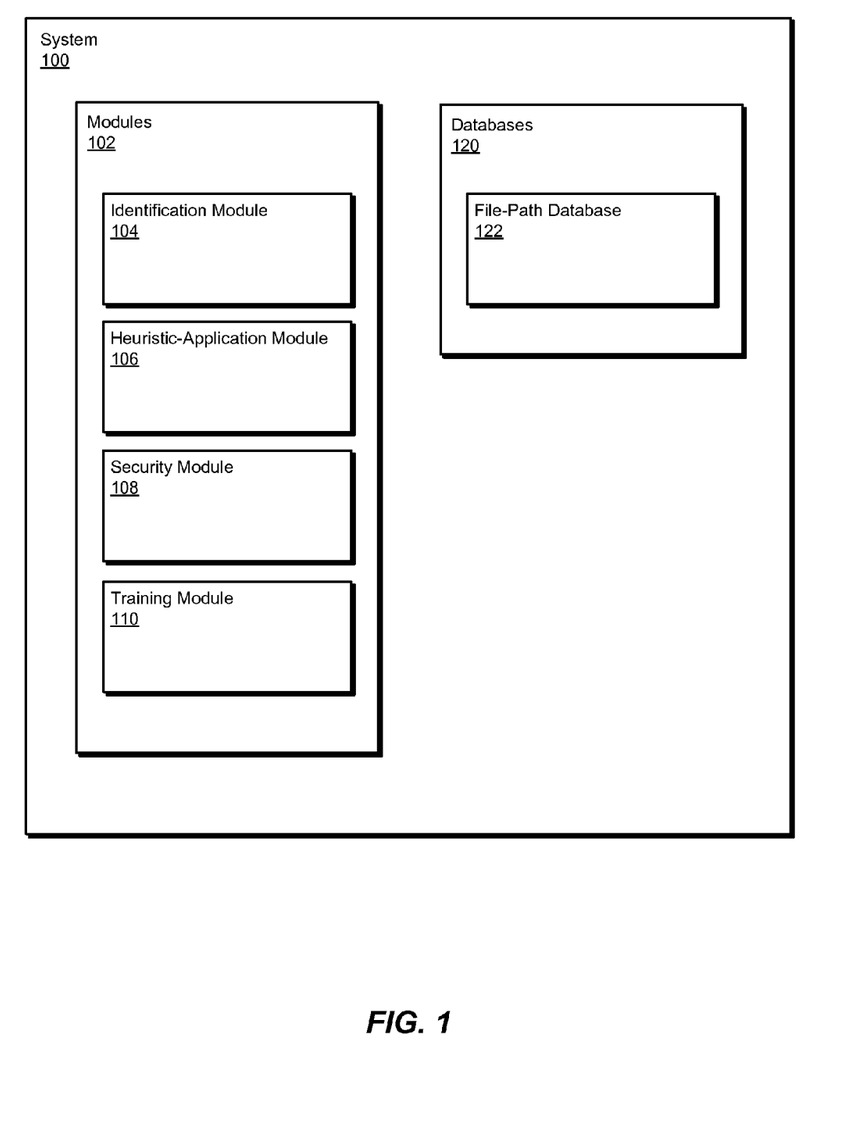
FIG. 1 is a block diagram of an exemplary system for using file paths to identify potentially malicious computer files.
Figure 2:
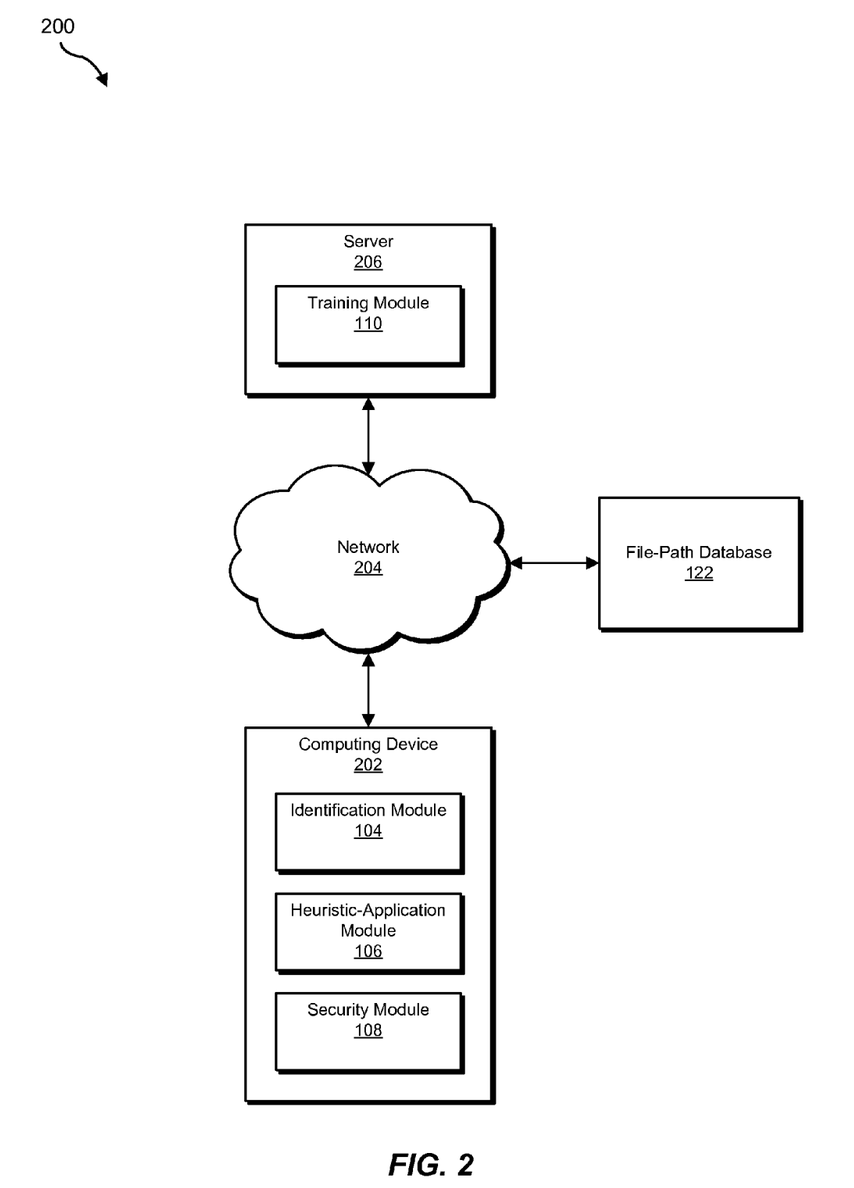
FIG. 2 is a block diagram of an exemplary system for using file paths to identify potentially malicious computer files.

The following will provide, with reference to FIGS. 1-2, detailed descriptions of exemplary systems for using file paths to identify potentially malicious computer files. Detailed descriptions of corresponding computer-implemented methods will also be provided in connection with FIGS. 3-4. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for using file paths to identify potentially malicious computer files. As illustrated in this figure, exemplary system 100 may include one or more modules 102 for performing one or more tasks. For example, and as will be explained in greater detail below, exemplary system 100 may include an identification module 104 programmed to identify a file and a file path associated with the file. Exemplary system 100 may also include a heuristic-application module 106 programmed to apply a heuristic to a file in order to determine whether at least a portion of the file path has likely been randomly generated. If heuristic-application module 106 determines that at least a portion of a file path has likely been randomly generated, heuristic-application module 106 may determine that the file is potentially malicious.

In addition, and as will be described in greater detail below, exemplary system 100 may include a security module 108 programmed to perform a security operation on a file that has been identified as being potentially malicious. Exemplary system 100 may also include a training module 110 programmed to train heuristics that may be used to determine whether at least a portion of a file path and/or file name associated with a file is likely to have been randomly generated. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 510 in FIG. 5, and/or portions of exemplary network architecture 600 in FIG. 6. One or more of modules 102 in FIG. 1 may also represent all or portions of one or more special-purpose computers configured to perform one or more tasks.

As illustrated in FIG. 1, exemplary system 100 may also include one or more databases 120. Databases 120 may represent portions of a single database or computing device or a plurality of databases or computing devices. In one embodiment, exemplary system 100 may include a file-path database 122 for storing a corpus of training data that includes the file paths of files that are known to be malicious and/or legitimate.

Databases 120 in FIG. 1 may represent a portion of one or more computing devices. For example, databases 120 may represent a portion of server 206 and/or computing device 202 in FIG. 2, computing system 510 in FIG. 5, and/or portions of exemplary network architecture 600 in FIG. 6. Alternatively, databases 120 in FIG. 1 may represent one or more physically separate devices capable of being accessed by a computing device, such as server 206 and/or computing device 202 in FIG. 2, computing system 510 in FIG. 5, and/or portions of exemplary network architecture 600 in FIG. 6.

Exemplary system 100 in FIG. 1 may be deployed in a variety of ways. For example, all or a portion of exemplary system 100 may represent portions of exemplary system 200 in FIG. 2. As shown in FIG. 2, system 200 may include a computing device 202 in communication with a server 206 and/or file-path database 122 via a network 204. In one embodiment, and as will be described in greater detail below, computing device 202 may be programmed to identify potentially malicious computer files based on whether the file paths of the computer files appear likely to have been randomly generated.

For example, and as will be explained in greater detail below, exemplary computing device 202 may include identification module 104, heuristic-application module 106, and/or security module 108. In this example, identification module 104 may identify files located on computing device 202 and/or files located on another computing device that is in communication with computing device 202 via network 204 (such as files stored on a third-party computing device connected to network 204). Upon identifying the files in question, identification module 104 may identify a file path and/or filename associated with the identified files.

Once identification module 104 has identified a file on computing device 202 and/or another computing device, heuristic-application module 106 may apply a heuristic to at least a portion of the file. For example, heuristic-application module 106 may apply a heuristic to all or a portion of a file path (such as a file name or at least one directory of the file path) associated with a file in order to determine whether the file path is likely to have been randomly generated. If heuristic-application module 106 determines that the file path associated with the file is likely to have been randomly generated, then heuristic-application module may determine that the file is potentially malicious, and security module 108 may perform a security operation on the file. For example, security module 108 may prevent computing device 202 from downloading the file and/or may quarantine or delete the file from computing device 202.

Computing device 202 generally represents any type or form of computing device capable of reading computer-executable instructions. Examples of computing device 202 include, without limitation, laptops, desktops, servers, cellular phones, personal digital assistants (PDAs), multimedia players, embedded systems, combinations of one or more of the same, exemplary computing system 510 in FIG. 5, or any other suitable computing device.

Server 206 generally represents any type or form of computing device that is capable of training heuristics that are utilized by computing devices, such as computing device 202, to identify potentially malicious files. Examples of server 206 include, without limitation, application servers and database servers configured to provide various database services and/or run certain software applications. As illustrated in FIG. 2, server 206 may include training module 110. In some embodiments, training module 110 may be located on computing device 202. As explained above, training module 110 may be used to train and/or refine a heuristic used to determine whether a file path associated with a file is likely to have been randomly generated.

In at least one example, training module 110 may train and refine this heuristic to identify characteristics of potentially malicious files using a corpus of samples containing known-malicious files and known-legitimate files. For example, file-path database 122 may contain a corpus of files (along with their associated file paths and/or file names) that are known to be malicious and/or legitimate. In this example, training module 110 may train the heuristic by applying and refining the heuristic using the corpus of samples contained within file-path database 122.

Network 204 generally represents any medium or architecture capable of facilitating communication or data transfer. Examples of network 204 include, without limitation, an intranet, a wide area network (WAN), a local area network (LAN), a personal area network (PAN), the Internet, power line communications (PLC), a cellular network (e.g., a GSM Network), exemplary network architecture 600 in FIG. 6, or the like. Network 204 may facilitate communication or data transfer using wireless or wired connections. In one embodiment, network 204 may facilitate communication between computing device 202 and server 206.

Figure 4:
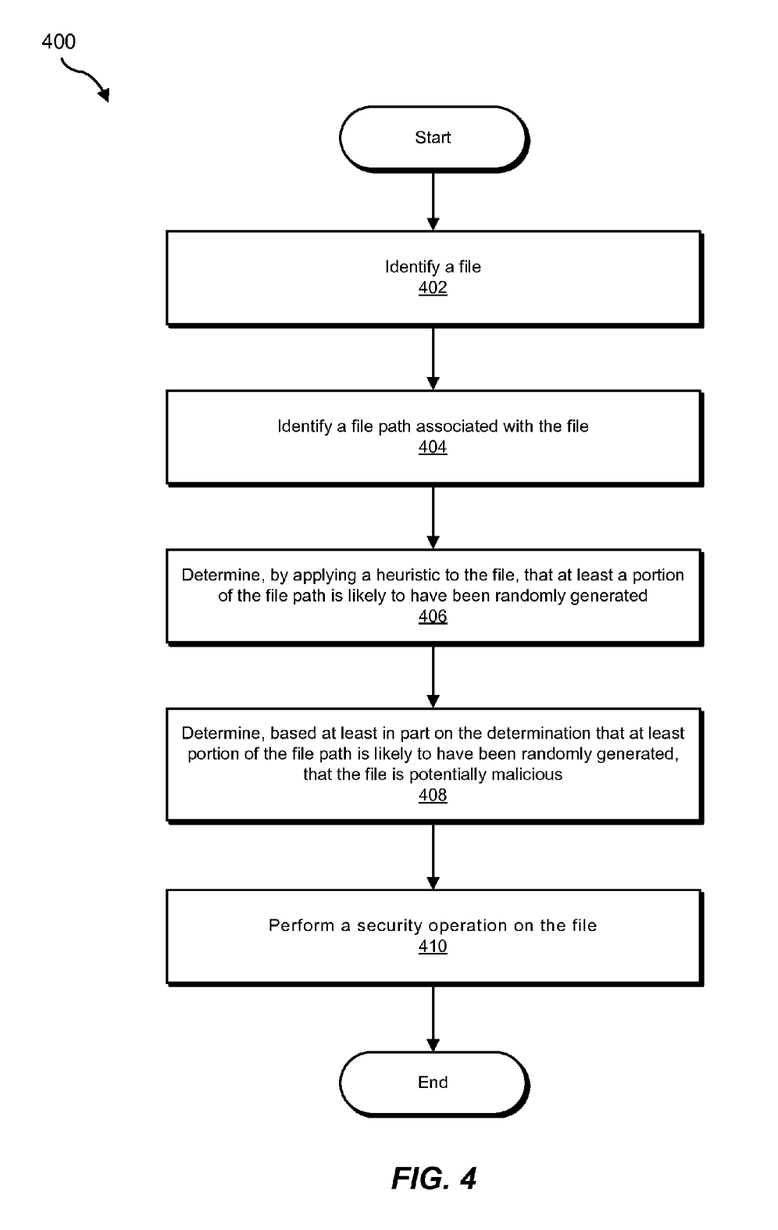
FIG. 4 is a flow diagram of an exemplary method for using file paths to identify potentially malicious computer files.

FIG. 4 is a flow diagram of an exemplary computer-implemented method 400 for using file paths to identify potentially malicious computer files. The steps shown in FIG. 4 may be performed by any suitable computer-executable code and/or computing system. In some embodiments, the steps shown in FIG. 4 may be performed by one or more of the components of system 100 in FIG. 1, system 200 in FIG. 2, computing system 510 in FIG. 5, and/or portions of exemplary network architecture 600 in FIG. 6.

As illustrated in FIG. 4, at step 402 one more of the various systems described herein may identify a file. For example, identification module 104 in FIG. 1 may, as part of computing device 202 in FIG. 2, identify a file encountered by computing device 202.

The systems described herein may perform step 402 in a variety of ways. In one example, identification module 104 may identify a file located on computing device 202. In another example, identification module 104 may identify a file located on a third party computing device that is in contact with computing device 202 via network 204 (such as a file served by a third-party device in communication with computing device 204).

At step 404, the systems described herein may identify a file path associated with the file identified in step 402. For example, identification module 104 in FIG. 1 may, as part of computing device 202 in FIG. 2, identify a file path, such as file path 300 or 310 illustrated in FIG. 3, associated with the file identified in step 402.

The term "file path," as used herein, generally refers to any convention or technique for specifying the unique location of a file within a file system. Examples of file paths include, without limitation, base directories (such as base directory 306 in FIG. 3), subdirectories (such as subdirectory 308 in FIG. 3), file names (such as file name 304 in FIG. 3), or the like.

Figure 3:
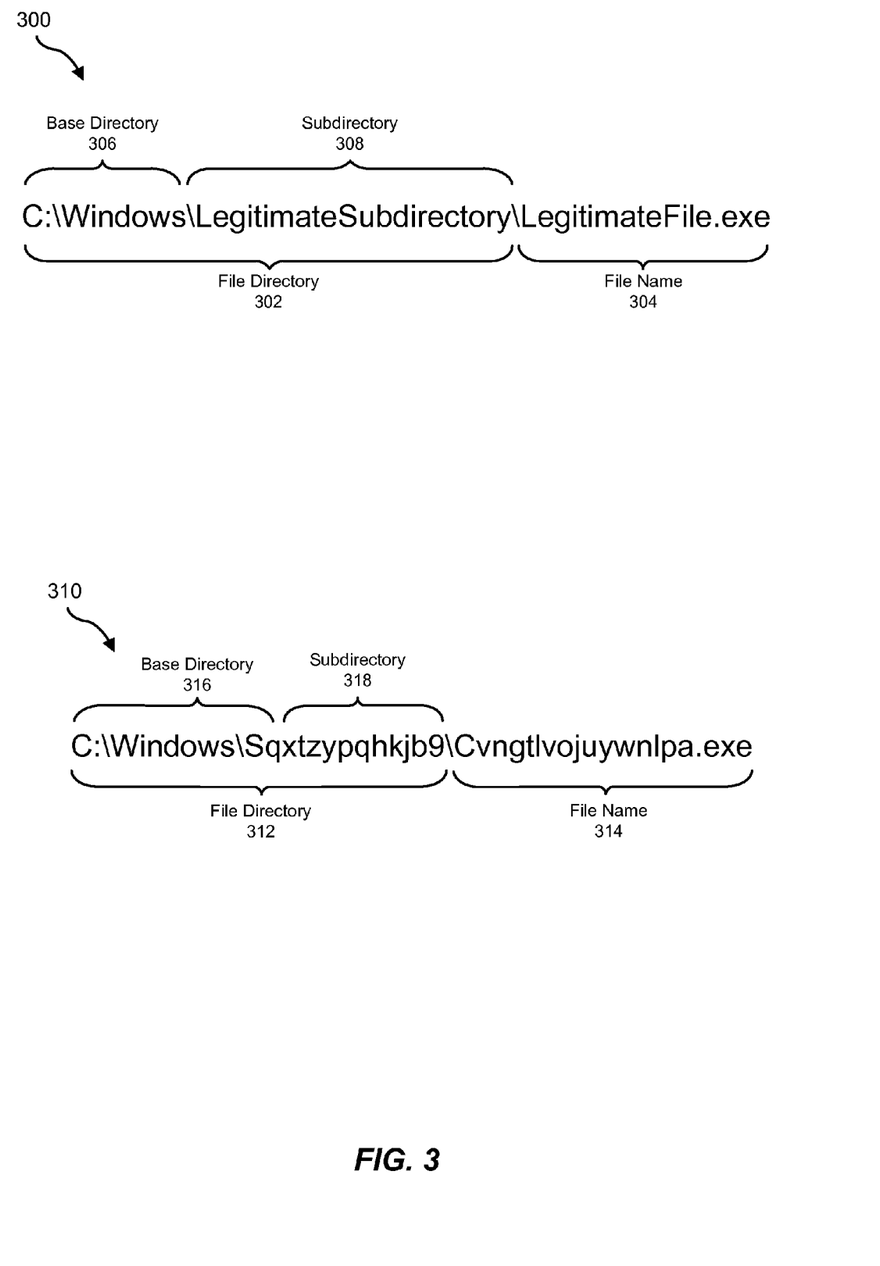
FIG. 3 is an illustration of exemplary file paths associated with potentially legitimate and/or potentially malicious files that may be identified and/or utilized by one or more of the embodiments described and/or illustrated herein.

FIG. 3 illustrates a first exemplary file path 300 associated with a first file and a second exemplary file path 310 associated a second file. As shown in FIG. 3, exemplary file path 300 may include a file directory 302 and a file name 304. File directory 302 may describe a location where a file represented by file name 304 is stored on computing device 202 and/or another computing device, such as a third party computing device that is in contact with computing device 202. In this example, file directory 302 may include a base directory 306 and at least one subdirectory, such as subdirectory 308. For example, FIG. 3 illustrates a base directory 306 labeled "C:\Windows," indicating that the file represented by file name 304 is stored on the "C:" drive of a computing device within the "Windows" directory. Subdirectory 308 may represent a location of the file within base directory 306. For example, the file represented by file path 300 may be stored within a subdirectory labeled "LegitimateSubdirectory." According to various embodiments, file directory 302 may include one or more additional subdirectories.

Similarly, exemplary file path 310 may include a file directory 312 describing a location where a file represented by file name 314 is stored on computing device 202 and/or another computing device. In this example, file directory 312 may include a base directory 316 and at least one subdirectory, such as subdirectory 318. File directory 312 may also include one or more additional subdirectories.

Returning to FIG. 4, at step 406 the systems described herein may determine, by applying a heuristic to the file identified in step 402, that at least a portion of the file path identified in step 404 has likely been randomly generated. For example, heuristic-application module 106 in FIG. 1 may, as part of computing device 202 in FIG. 2, determine, by applying a heuristic to file path 310 in FIG. 3, that at least a portion of file path 310 (e.g., subdirectory 318 and file name 314) appears to have been generated by a randomization process (such as a process involving a randomization algorithm).

The term "heuristic," as used herein, generally refers to any type or form of algorithm, rule, policy, formula, process, model, or tool that may be used to classify, or make decisions with respect to, an object or sample, such as a file. In some examples, the various heuristics described herein may represent, without limitation, decision trees or other algorithms designed to detect and/or identify malware. In other examples, these heuristics may simply represent processes or procedures for performing database lookups in an attempt to determine the prevalence (or uniqueness) of a file path, as explained below.

In some examples, the heuristic may be used to analyze various aspects of the file path in order to reach a determination as to whether the file path is likely to have been randomly generated. For example, heuristic-application module 106 may, as part of computing device 202 in FIG. 2, apply a heuristic (such as a decision tree) to a file encountered by computing device 202. The decision tree may include one or more branches for analyzing various characteristics of a file path. The decision tree may also include various nodes at the end of each branch, including terminal nodes associated with a particular probability that at least a portion of the file path is randomly generated.

In some examples, heuristic-application module 106 may determine, by applying the heuristic to a file path, that at least a portion of the file path has likely been randomly generated if the distribution of characters within at least a portion of the file path for the file is indicative of a randomly generated file directory or filename. As used herein, a "character" may refer to an alphanumeric character, such as a letter or number. In some examples, a "character" may also refer to a punctuation mark, symbol, and/or or space used in a file path.

In addition, a "distribution" of characters may refer to a frequency distribution of the characters. For example, a distribution of characters within a portion of a file path may indicate the relative frequency that each character and/or selected characters appear within the portion of a file path. Additionally, the distribution of characters may indicate the location of each character and/or selected characters within the portion of the file path. For example, the distribution of characters may indicate the number of times the letter "e" appears within a file name. Additionally, the distribution of characters may indicate whether the letter "e" appears at the beginning, end, and/or other position within the file name.

File paths associated with legitimate files may include relatively common distributions of characters. For example, distributions of characters in file paths that are not randomly generated, such as file paths associated with legitimate files (such as, e.g., file path 300 in FIG. 3), may include a higher frequency of certain common characters than other less common characters. For example, various vowels and common consonants, such as "e," "t," and "a" may be more frequently distributed in file names associated with legitimate files than less common consonants, such as "q," "x," and "z." In contrast to a file path associated with a legitimate file, a file path that has been randomly generated (such as, e.g., file path 310 in FIG. 3) may include a relatively flat distribution of characters, indicating a random distribution of characters. For example, less common characters may be present within a randomly generated file name at a similar frequency as more common characters.

In some examples, the location of various characters within a file path may also be used by heuristic-application module 106 to determine the likelihood that a file path has been randomly generated. For example, certain characters may appear more frequently or less frequently at the beginning and/or end of common file names associated with legitimate files. Accordingly, the presence or absence of such characters at the beginning or end of a file name may indicate that the file path has been randomly generated.

In some examples, the systems described herein may determine that the distribution of characters within at least a portion of a file path is likely random if the frequency of occurrence at least one common series of characters, such as a common digraph, trigraph, or substring, fails to meet a predetermined threshold. As used herein, the term "digraph" may refer to a sequence of two characters while the term "trigraph" may refer to a sequence of three characters. In some examples, heuristic-application module 106 may determine that a file name, such as file name 314 in FIG. 3, does not include at least one common, or non-random, digraph, trigraph, and/or other series of characters. For example, heuristic-application module 106 may determine that subdirectory 318 and file name 314 in FIG. 3 do not include common digraphs, such as "th," "he," or "an," indicating that subdirectory 318 and/or file name 314 were likely randomly generated.

In some examples, the systems described herein may determine that the distribution of characters within at least a portion of the file path is likely random by identifying at least one rare, or random, series of characters within the file path. In at least one example, heuristic-application module 106 may determine that the file path includes at least one rare digraph, trigraph, and/or other series of characters. For example, heuristic-application module 106 may determine that subdirectory 318 and file name 314 in FIG. 3 include rare digraphs, such as "qx," "yp," and "cv," indicating that subdirectory 318 and/or file name 314 were likely randomly generated.

In some examples, the systems described herein may train a heuristic using a corpus or set of training data prior to applying the same. For example, training module 110 in FIG. 1 may train a heuristic using training data that includes file paths associated with files that are known to be malicious and/or file paths associated with files that are known to be legitimate. In some examples, a relatively large number of file paths may be used while training the heuristic. Any suitable algorithm may be used to identify various characteristics that are common to file paths associated with malicious files and/or file paths associated with legitimate files. For example, training module 110 may identify distributions of characters that are common to file names associated with legitimate files.

In at least one example, training module 110 may determine an aggregate distribution of characters within file paths associated with files that are known to be malicious and/or file paths associated with files that are known to be legitimate. After the aggregate distribution of characters within the file paths is determined, training module 110 may weight each of the characters and/or specified characters within the file paths based on the aggregate frequency of the characters. For example, an aggregate distribution of characters within file paths for legitimate files may include the letter "e" more frequently than other characters. Accordingly, training module 110 may weight the letter "e" more highly in the heuristic than other less common characters. Accordingly, when the heuristic is applied to a file path that does not contain the letter "e" more frequently than other less common characters, heuristic-application module 106 may determine that the file path is likely to have been randomly generated.

In certain examples, the systems described herein may aggregate file paths for training purposes based on a subset of the file paths, such as the base directories of the file paths (e.g., base directories 306 and 316 in FIG. 3). For example, training module 110 may aggregate file paths associated with files that are known to be legitimate based on whether the file paths include the base directory "C:\Windows" or the base directory "C:\Documents and Settings." The aggregate distributions of characters may differ within different subsets of the file paths, and such differences may be exploited by the heuristic to determine with greater certainty whether file paths are potentially legitimate or malicious. For example, in analyzing a file path associated with an unknown file, heuristic-application module 106 may determine that the file path includes the base directory "C:Windows." Heuristic-application module 106 may then apply a heuristic that has been trained using file-path data aggregated from known file paths that include the base directory "C:Windows."

In other examples, the systems described herein may determine that at least a portion of a file path is likely to have been randomly generated by determining that the file path (or at least a portion thereof) is likely unique since legitimate file paths and file names are rarely singletons (i.e., multiple instances of legitimate file names and/or file paths commonly occur). In one example, the systems described herein may determine that at least a portion of a file path is likely unique (and thus likely to have been randomly generated) if at least a portion of the file path is not located within a database, such as file-path database 122.

For example, heuristic-application module 106 may search for a file name, such as file name 314, within a database including a large collection of file names, such as file-path database 122 in FIGS. 1 and 2. If such a search yields no results, heuristic-application module 106 may determine that the file name is likely a unique file name. In this example, this unique file name may indicate that the file name has been randomly generated. As detailed above, file-path database 122 generally represents any type or form of database or storage device capable of storing information that identifies the file paths (such as a directories and/or file names) associated with files. Examples of file-path database 122 include, without limitation, an Internet search engine database and/or a community based reputation database.

Returning to FIG. 4, at step 408 one or more of the systems described herein may determine, based at least in part on the determination made in step 406 that at least a portion of the file path is likely to have been randomly generated, that the file is potentially malicious. For example, if heuristic-application module 106 in FIG. 1 determines that file 304 in FIG. 3 is likely to have been randomly generated, then heuristic-application determination module 106 may, as part of computing device 202 in FIG. 2, determine that the file is likely malicious.

The systems described herein may perform step 408 in a variety of ways. In one example, heuristic-application module 106 may determine whether a file is malicious by calculating or determining a probability that the file is malicious. For example, a heuristic may be designed to identify a probability that the file is malicious based on certain identified characteristics of the file. In some embodiments, the heuristic may include a decision tree having various terminal nodes at the terminal ends of the decision tree branches. Each of the terminal ends of the decision tree branches may be associated with a probability that a file is malicious and/or legitimate. According to certain embodiments, the probability may be represented as a confidence score and/or a percentage. For example, a relatively high confidence score (e.g., 85 out of 100) may indicate a high probability that a file is malicious.

Confidence scores generally represent the error-rate potential for a specific function of a heuristic (such as a branch of a decision tree), as judged by the number of training samples encountered or classified by this specific function. Confidence scores may be calculated and quantified in a variety of ways. For example, confidence scores may be calculated using normal approximation intervals, Wilson score intervals, Clopper-Pearson intervals, or any other suitable method or algorithm.

In some embodiments, the heuristic applied in step 406 may be combined with additional heuristics in step 408 in order to improve the confidence of a malware classification and/or to reduce the likelihood false positives. For example, if heuristic-application module 106 determines that a file path for a file has likely been randomly generated, one or more of the systems described herein may generate a fingerprint of the file, such as a hash, and compare the hash to a whitelist database and/or a blacklist database. If the hash is found within a blacklist database and/or if the hash is not found within a whitelist database, then the file may be determined to be malicious. A whitelist database may also be used to mitigate a false positive determination that a file is malicious. For example, if heuristic-application module 106 determines that a file is likely malicious, a hash of the file may be compared with a whitelist database. If the hash is found within the whitelist database, then the file may be determined to be legitimate. In additional examples, at least one additional malware-detection heuristic may be applied to the file to more conclusively determine whether the file is malicious or legitimate.

Returning to FIG. 4, at step 410 one or more of the systems described herein may perform a security operation on the file. For example, if heuristic-application 106 determines that the file identified in step 402 is potentially malicious, then security module 108 may, as part of computing device 202 in FIG. 2, perform a security operation on the file in order to protect computing device 202 from the potentially malicious file.

Security module 108 may perform any of a variety of security operations on the file. For example, security module 108 may prevent computing device 202 from downloading the file, communicating with a server or computing device that distributed the file, quarantine the file, and/or delete the file from computing device 202. Security module 108 may also add at least a portion of the file path, and/or a hash of the file, to a blacklist database and/or add at least a portion of the file path to a reputation database. Upon completion of step 410, exemplary method 400 in FIG. 4 may terminate.

As detailed above, by training and using a heuristic to determine whether a file is potentially malicious based at least in part on whether at least a portion of a file path or file name associated with the file has likely been randomly generated, the systems and methods described herein may effectively identify malicious files, even if these malicious files are not specifically identified in a malware database, such as a blacklist. Accordingly, the systems and methods described herein may provide a greater degree of protection against constantly evolving malware threats.

Figure 5:
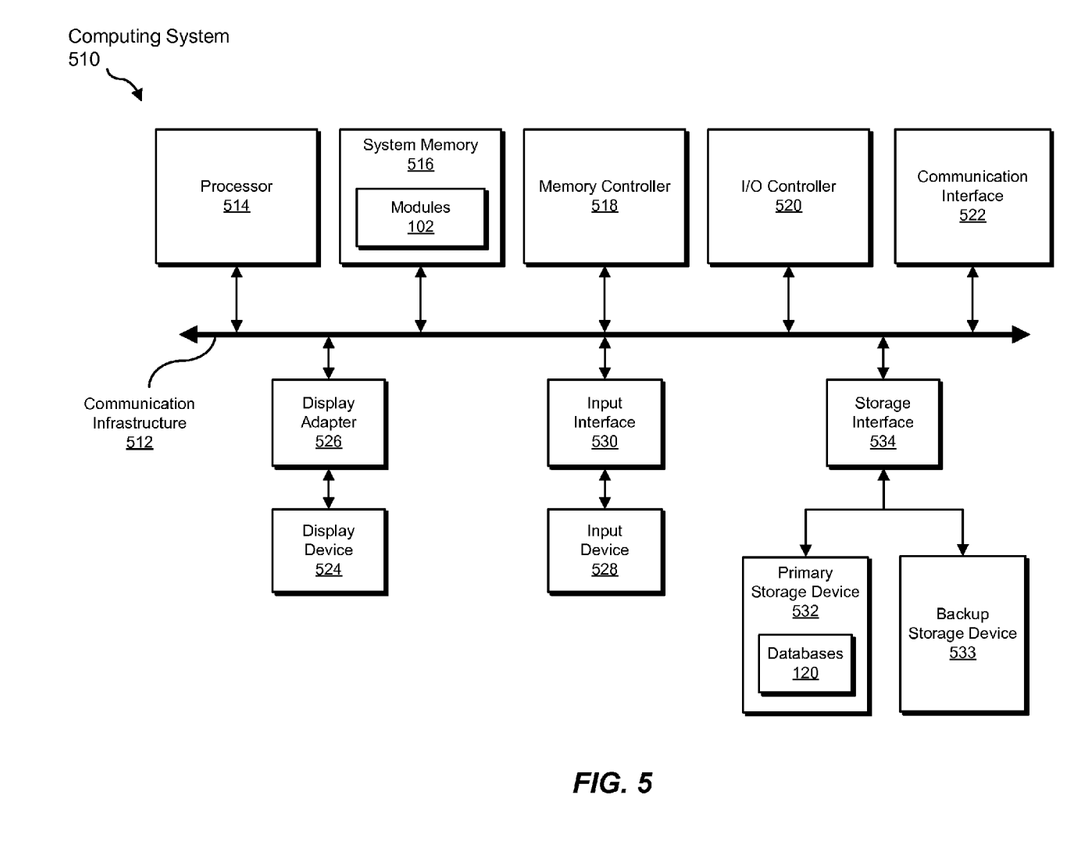
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein. For example, processor 514 may perform and/or be a means for performing, either alone or in combination with other elements, one or more of the identifying, determining, performing, applying, weighting, preventing, and/or deleting steps described herein. Processor 514 may also perform and/or be a means for performing any other steps, methods, or processes described and/or illustrated herein.

System memory 516 generally represents any type or form of volatile or non-volatile storage device or medium capable of storing data and/or other computer-readable instructions. Examples of system memory 516 include, without limitation, random access memory (RAM), read only memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an ISA, PCI, PCIe, or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512. In certain embodiments, memory controller 518 may perform and/or be a means for performing, either alone or in combination with other elements, one or more of the steps or features described and/or illustrated herein, such as identifying, determining, performing, applying, weighting, preventing, and/or deleting.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534. I/O controller 520 may be used, for example, to perform and/or be a means for performing, either alone or in combination with other elements, one or more of the identifying, determining, performing, applying, weighting, preventing, and/or deleting steps described herein. I/O controller 520 may also be used to perform and/or be a means for performing other steps and features set forth in the instant disclosure.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution. In certain embodiments, communication interface 522 may perform and/or be a means for performing, either alone or in combination with other elements, one or more of the identifying, determining, performing, applying, weighting, preventing, and/or deleting steps disclosed herein. Communication interface 522 may also be used to perform and/or be a means for performing other steps and features set forth in the instant disclosure.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device. In at least one embodiment, input device 528 may perform and/or be a means for performing, either alone or in combination with other elements, one or more of the identifying, determining, performing, applying, weighting, preventing, and/or deleting steps disclosed herein. Input device 528 may also be used to perform and/or be a means for performing other steps and features set forth in the instant disclosure.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a floppy disk drive, a magnetic tape drive, an optical disk drive, a flash drive, or the like. Storage interface 534 generally represents any type or form of interface or device for transferring data between storage devices 532 and 533 and other components of computing system 510. In one example, databases 120 from FIG. 1 may be stored in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

In certain embodiments, storage devices 532 and 533 may be used, for example, to perform and/or be a means for performing, either alone or in combination with other elements, one or more of the identifying, determining, performing, applying, weighting, preventing, and/or deleting steps disclosed herein. Storage devices 532 and 533 may also be used to perform and/or be a means for performing other steps and features set forth in the instant disclosure.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an application specific integrated circuit (ASIC) adapted to implement one or more of the exemplary embodiments disclosed herein.

Figure 6:
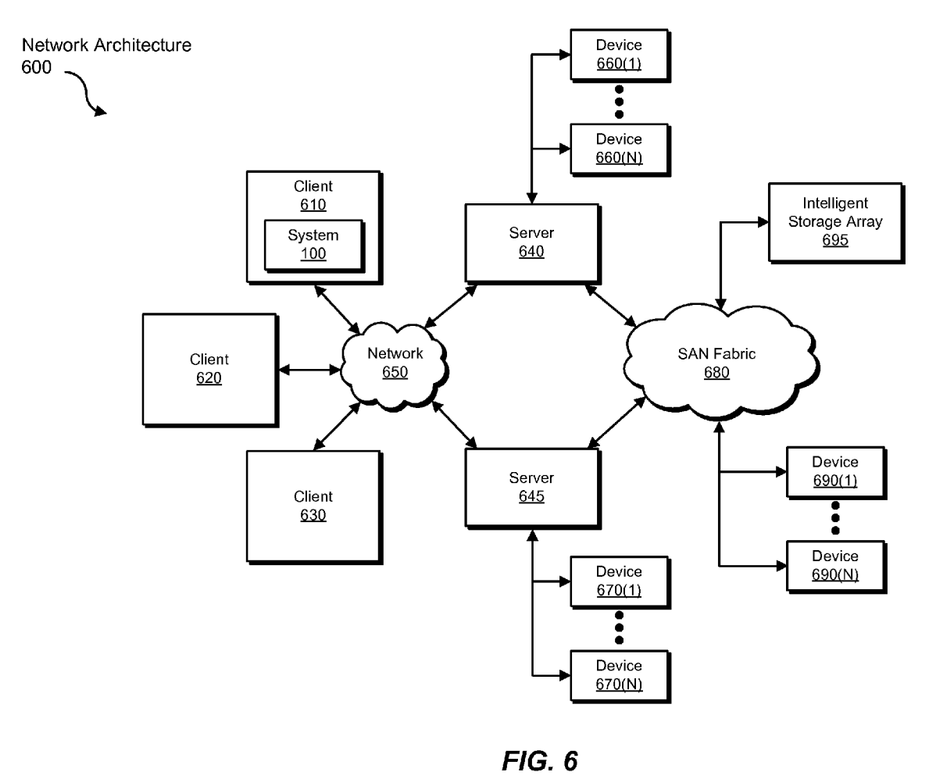
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. Client systems 610, 620, and 630 generally represent any type or form of computing device or system, such as exemplary computing system 510 in FIG. 5.

Similarly, servers 640 and 645 generally represent computing devices or systems, such as application servers or database servers, configured to provide various database services and/or run certain software applications. Network 650 generally represents any telecommunication or computer network including, for example, an intranet, a wide area network (WAN), a local area network (LAN), a personal area network (PAN), or the Internet. In one example, client systems 610, 620, and/or 630 and/or servers 640 and/or 645 may include system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent network-attached storage (NAS) devices configured to communicate with servers 640 and 645 using various protocols, such as NFS, SMB, or CIFS.

Servers 640 and 645 may also be connected to a storage area network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650. Accordingly, network architecture 600 may perform and/or be a means for performing, either alone or in combination with other elements, one or more of the identifying, determining, performing, applying, weighting, preventing, and/or deleting steps disclosed herein. Network architecture 600 may also be used to perform and/or be a means for performing other steps and features set forth in the instant disclosure.

As detailed above, computing system 510 and/or one or more components of network architecture 600 may perform and/or be a means for performing, either alone or in combination with other elements, one or more steps of an exemplary method for using file paths to identify potentially malicious computer files.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, security module 108 and/or training module 110 in FIG. 1 may transform various characteristics and/or properties of computing device 202 in FIG. 2 by deleting and/or modifying files stored on computing device 202, server 206, and/or file-path database 122.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for using file paths to identify potentially malicious computer files the method comprising:
   identifying a file using a computing device comprising at least one processor;
   identifying, by the computing device, a file path associated with the file;
   determining, by the computing device and applying a heuristic that weights one or more alphanumeric characters within the file path based at least in part on the aggregate frequency of the alphanumeric characters, that at least a portion of the file path is likely to have been randomly generated by:
      determining the frequency of occurrence of each alphanumeric character within the file path;
      determining, based on an analysis of the frequency of occurrence of the weighted alphanumeric characters within the file path, that less-common alphanumeric characters are present within at least a portion of the file path at a similar frequency as more-common alphanumeric characters;
      determining the position of each alphanumeric character within the file path;
      determining, based on an analysis of the position of each alphanumeric character within the file path, that the distribution of alphanumeric characters within at least a portion of the file path is likely random;
   determining, by the computing device and based at least in part on the determination that at least a portion of the file path has likely been randomly generated, that the file is potentially malicious;
   performing, by the computing device, a security operation on the file upon determining that the file is potentially malicious.

2. The method of claim 1, wherein determining that at least a portion of the file path is likely to have been randomly generated further comprises at least one of:
   determining that the frequency of occurrence of common alphanumeric digraphs within at least a portion of the file path fails to meet a predetermined threshold;
   determining that the frequency of occurrence of common alphanumeric trigraphs within at least a portion of the file path fails to meet a predetermined threshold;
   determining that the frequency of occurrence of a common series of alphanumeric characters within at least a portion of the file path fails to meet a predetermined threshold.

3. The method of claim 1, wherein determining that at least a portion of the file path is likely to have been randomly generated further comprises at least one of:
   identifying at least one rare alphanumeric digraph within the file path;
   identifying at least one rare alphanumeric trigraph within the file path;
   identifying at least one rare series of alphanumeric characters within the file path.

4. The method of claim 1, wherein the file path comprises at least one of:
   a file directory;
   a file name.

5. The method of claim 1, further comprising, prior to applying the heuristic, training the heuristic using a set of training data, the training data comprising:

file paths for files that are known to be malicious;
file paths for files that are known to be legitimate.

6. The method of claim 5, wherein training the heuristic using the set of training data further comprises:
determining an aggregate distribution of alphanumeric characters within the file paths for the files that are known to be malicious;
weighting each of the alphanumeric characters within the file paths for the files that are known to be malicious based on the aggregate distribution of the alphanumeric characters.

7. The method of claim 5, wherein training the heuristic using the set of training data further comprises:
determining an aggregate distribution of alphanumeric characters within the file paths for the files that are known to be legitimate;
weighting each of the alphanumeric characters within the file paths for the files that are known to be legitimate based on the aggregate distribution of the alphanumeric characters.

8. The method of claim 1, wherein the heuristic comprises a decision tree.

9. The method of claim 1, wherein determining that at least a portion of the file path is likely to have been randomly generated comprises determining that at least a portion of the file path is not located within a file-path database.

10. The method of claim 9, wherein the file-path database comprises at least one of:
an Internet search engine database;
a reputation database.

11. The method of claim 1, wherein determining that the file is potentially malicious further comprises at least one of:
determining that the file is identified within a blacklist database;
determining that the file is not identified within a whitelist database;
determining that at least one additional malware-detection heuristic identifies the file as potentially malicious.

12. The method of claim 11, wherein performing the security operation comprises performing at least one of:
preventing a computing device from downloading the file;
preventing a computing device from communicating with a server or computing device that distributed the file;
deleting the file from a computing device;
identifying the file in the blacklist database;
identifying the file in a reputation database.

13. The method of claim 1, wherein determining that the file is potentially malicious comprises determining a probability that the file is malicious.

14. The method of claim 13, wherein the probability that the file is malicious is represented as a confidence score.

15. The method of claim 1, tangibly embodied as computer executable instructions on at least one non-transitory computer-readable medium.

16. A system for identifying potentially malicious computer files, the system comprising:
an identification module programmed to:
identify a file;
identify a file path associated with the file;
a heuristic-application module programmed to:
determine, by applying a heuristic that weights one or more alphanumeric characters within the file path based at least in part on the aggregate frequency of the alphanumeric characters, that at least a portion of the file path is likely to have been randomly generated by:
determining the frequency of occurrence of each alphanumeric character within the file path;
determining, based on an analysis of the frequency of occurrence of the weighted alphanumeric characters within the file path, that less common alphanumeric characters are present within at least a portion of the file path at a similar frequency as more-common alphanumeric characters;
determining the position of each alphanumeric character within the file path;
determining, based on an analysis of the position of each alphanumeric character within the file path, that the distribution of alphanumeric characters within at least a portion of the file path is likely random;
determine, based at least in part on the determination that at least portion of the file path has likely been randomly generated, that the file is potentially malicious;
a security module programmed to perform a security operation on the file upon determining that the file is potentially malicious;
a processor for executing the identification module, the heuristic-application module, and the security module.

17. The system of claim 16, further comprising a training module programmed to, prior to applying the heuristic, train the heuristic using a set of training data, the training data comprising:
file paths for files that are known to be malicious;
file paths for files that are known to be legitimate.

18. A non-transitory computer-readable-storage medium comprising one or more computer-executable instructions that cause the computing device to:
identify, when executed by at least one processor of a computing device, a file;
identify, by the processor, a file path associated with the file;
determine, by the processor and applying a heuristic that weights one or more alphanumeric characters within the file path based at least in part on the aggregate frequency of the alphanumeric characters, that at least a portion of the file path is likely to have been randomly generated by:
determining the frequency of occurrence of each alphanumeric character within the file path;
determining, based on an analysis of the frequency of occurrence of the weighted alphanumeric characters within the file path, that less-common alphanumeric characters are present within at least a portion of the file path at a similar frequency as more-common alphanumeric characters;
determining the position of each alphanumeric character within the file path;
determining, based on an analysis of the position of each alphanumeric character within the file path, that the distribution of alphanumeric characters within at least a portion of the file path is likely random;
determine, by the processor and based at least in part on the determination that at least a portion of the file path has likely been randomly generated, that the file is potentially malicious;
perform, by the processor a security operation on the file upon determining that the file is potentially malicious.

* * * * *

UNITED STATES PATENT AND TRADEMARK OFFICE
CERTIFICATE OF CORRECTION

PATENT NO. : 8,769,685 B1  
APPLICATION NO. : 12/699183  
DATED : July 1, 2014  
INVENTOR(S) : Robert Conrad and David Kane Page 1 of 1

It is certified that error appears in the above-identified patent and that said Letters Patent is hereby corrected as shown below:

In the Claims

Claim 1, column 16, lines 5 to 7, should read:  
A computer-implemented method for using file paths to identify potentially malicious computer files, the method comprising:

Claim 15, column 17, lines 52 to 54, should read:  
The method of claim 1, tangibly embodied as computer-executable instructions on at least one non-transitory computer-readable medium.

Claim 16, column 18, lines 3 to 8, should read:  
determining, based on an analysis of the frequency of occurrence of the weighted alphanumeric characters within the file path, that less-common alphanumeric characters are present within at least a portion of the file path at a similar frequency as more-common alphanumeric characters;

Claim 16, column 18, lines 16 to 19, should read:  
determine, based at least in part on the determination that at least a portion of the file path has likely been randomly generated, that the file is potentially malicious;

Signed and Sealed this  
Second Day of December, 2014

Michelle K. Lee  
*Deputy Director of the United States Patent and Trademark Office*